(12) United States Patent
Landon et al.

(10) Patent No.: US 10,350,705 B2
(45) Date of Patent: Jul. 16, 2019

(54) MICROMACHINING METHOD FOR PATTERNING A MATERIAL

(71) Applicant: QIOVA, Saint Etienne (FR)

(72) Inventors: Sebastien Landon, Saint Etienne (FR); Yoan Di Maio, Saint Etienne (FR); Benjamin Dusser, Poncins (FR)

(73) Assignee: QIOVA, Saint Etienne (FR)

( * ) Notice: Subject to any disclaimer, the term of this patent is extended or adjusted under 35 U.S.C. 154(b) by 166 days.

(21) Appl. No.: 15/323,369

(22) PCT Filed: Jul. 1, 2015

(86) PCT No.: PCT/EP2015/065045
§ 371 (c)(1),
(2) Date: Dec. 30, 2016

(87) PCT Pub. No.: WO2016/001335
PCT Pub. Date: Jan. 7, 2016

(65) Prior Publication Data
US 2017/0157707 A1     Jun. 8, 2017

(30) Foreign Application Priority Data

Jul. 1, 2014  (FR) ..................................... 14 56276
Jul. 1, 2014  (FR) ..................................... 14 56277

(51) Int. Cl.
*B23K 26/0622* (2014.01)
*B23K 26/352* (2014.01)
(Continued)

(52) U.S. Cl.
CPC ........ *B23K 26/0622* (2015.10); *B23K 26/046* (2013.01); *B23K 26/352* (2015.10); *B42D 25/41* (2014.10); *G06K 1/126* (2013.01)

(58) Field of Classification Search
CPC .......... B23K 9/1043; B23K 26/0622;qa B23K 26/352; B23K 26/046
(Continued)

(56) References Cited

U.S. PATENT DOCUMENTS 4,128,752 A   12/1978  Gravel
4,734,558 A    3/1988  Nakano et al.
(Continued)

FOREIGN PATENT DOCUMENTS

EP    1372016    12/2003
FR    2872351    12/2005
(Continued)

OTHER PUBLICATIONS

French Search Report dated Mar. 12, 2015, FR Application No. 1456277.
(Continued)

*Primary Examiner* — Phuong T Nguyen
(74) *Attorney, Agent, or Firm* — Womble Bond Dickinson (US) LLP

(57) ABSTRACT

The present invention relates to a micromachining method for patterning a material. The pattern is made up of a plurality of points. Said method includes the following steps: —emitting a spatially and temporally coherent pulsed light beam; —dynamically shaping said spatially and temporally coherent pulsed light beam in a modulation plane of a dynamic optical modulation device by applying at least one phase modulation so as to shape said light beam in accordance with the plurality of points forming the pattern; and —focusing the thus-shaped light beam, by means of a focusing device, on one surface of said material placed within a working plane in a Fourier configuration relative to the modulation plane. In said method, patterning the material is carried out with a pulse train containing a finite (Continued)

number of pulses of said light beam that is strictly less than the number of points forming the pattern, and emission of the light beam is controlled so that each pulse has a predetermined pulse duration between 10 ps and 100 ns. The invention also relates to a micromachining system for implementing said method and to a method for using said system.

23 Claims, 5 Drawing Sheets

(51) Int. Cl.
    *G06K 1/12*     (2006.01)
    *B42D 25/41*     (2014.01)
    *B23K 26/046*     (2014.01)

(58) Field of Classification Search
    USPC .............. 219/121.6, 121.61, 121.68, 121.69,
                    219/121.73, 121.74, 121.75, 121.85
    See application file for complete search history.

(56) References Cited

U.S. PATENT DOCUMENTS

| | | | |
|---|---|---|---|
| 4,818,835 | A | 4/1989 | Kuwabara et al. |
| 5,075,195 | A | 12/1991 | Babler et al. |
| 5,734,145 | A | 3/1998 | Ichihara et al. |
| 6,573,026 | B1 | 6/2003 | Aitken et al. |
| 6,774,340 | B1 | 8/2004 | Chiba et al. |
| 2001/0045418 | A1 | 11/2001 | Brandinger et al. |
| 2002/0130245 | A1 | 9/2002 | Fujimoto et al. |
| 2003/0010763 | A1 | 1/2003 | Fukuchi et al. |
| 2006/0124618 | A1 | 6/2006 | Sugioka et al. |
| 2010/0000978 | A1 | 1/2010 | Matsumoto et al. |
| 2010/0040836 | A1 | 2/2010 | Li et al. |
| 2011/0045418 | A1 | 2/2011 | Russell |
| 2011/0292157 | A1* | 12/2011 | Ghauri .................... B41J 2/442 347/255 |

FOREIGN PATENT DOCUMENTS

| | | |
|---|---|---|
| FR | 2884743 | 10/2006 |
| FR | 2909922 | 6/2008 |
| FR | 2921012 | 3/2009 |
| JP | 06-208088 | 7/1994 |
| JP | 2010-012494 A | 1/2010 |
| JP | 2013-063455 A | 4/2013 |
| WO | WO-2001061619 | 8/2001 |
| WO | WO-2001079935 | 10/2001 |
| WO | WO-2009090324 | 7/2009 |

OTHER PUBLICATIONS

French Search Report dated Mar. 4, 2015, FR Application No. 1456276.
International Search Report dated Sep. 4, 2015, PCT Application No. PCT/EP2015/065045.
Bonse, et al., "Femtosecond laser ablation of silicon—modification thresholds and morphology", Applied Physics A, vol. 74, 2002, 19-25.
Dusser, et al., "Controlled nanostructrures formation by ultra fast laser pulses for color marking", Optics Express, vol. 18, No. 3, Feb. 1, 2010, 2913-2924.
Landon, "Micro- et nano-usinage par laser á impulsions ultracourtes: amélioration de procédés par des méthodes tout optique", Université Jean Monnet—Saint-Etienne, 2011, Jul. 19, 2012.
Liu, "Simple technique for measurements of pulsed Gaussian-beam spot sizes", Optics Letters, vol. 7, No. 5, May 1982, 196-198.
Sanner, et al., "Measurement of femtosecond laser-induced damage and ablation thresholds in dielectrics", Applied Physics A, vol. 94, 2009, 889-897.
Vorobyev, et al., "Colorizing metals with femtosecond laser pulses", Applied Physics Letters vol. 92, Apr 19, 2014, 2008, 1-3.
Office Action received for Japanese Patent Application No. 2017-519993, dated Dec. 25, 2018, 14 pages (7 pages of English Translation and 7 pages of Original Language Office Action).

* cited by examiner

MICROMACHINING METHOD FOR PATTERNING A MATERIAL

FIELD OF THE INVENTION

The present invention relates to the field of micromachining materials used in particular for marking these materials, via a micromachining method and system matching industrial productions rates, for example for marking products for identification applications and/or the authentication of such products.

PRIOR ART

Today, in the context of the strong growth of marking, the existing laser technologies largely took over thanks to their capacity to machine a great majority of materials, meeting present industrial issues while showing, at the same time, a high potential for added value according to operation parameters and methods. There are, however, markets where laser technologies reach their limits, namely productions with high production rates, for example the food-processing industry, the pharmaceutical industry, the fiduciary companies and the electronics sector, generally manufacturing small products in very large quantities.

These days, the most widespread marking technology relies on the combination of a laser source with varied radiation properties (power, pulse repetition rate, energy, wavelength, pulse duration, etc.), coupled to a deflection head. This head is used both for focusing of the laser beam, i.e. the spatial concentration of the beam in one point, and for its controlled and automated motion within the space of the part to be marked, similar to the tip of a pen. The deflection head is generally a galvanometric head consisting of two mirrors rotating about two orthogonal axes. The motorisation of these two mirrors leads to an angular deviation of the beam along the desired direction, then linearly converted into a distance on the sample plane, by means of a focusing "f-theta" lens. Other technologies, also based on the mechanical movement of optical systems (mirrors, prisms, disc, polygons . . . ) have been developed for specific needs, and also to increase the marking speed. However, the use of these systems at high productions rates raises many issues relating, e. g., to the speed of execution and the stability of the rotating mirrors, the synchronisation of movements with the pulse repetition rate of the laser beam, the correction of the motion depending on the transport speed of the products to mark. Once all these limiting points are treated, only new systems, either faster and thus more expensive, or more inventive, but yet very specific, are able, possibly, to meet this requirement. The patent of Ichihara et al. published under the U.S. Pat. No. 5,734,145 proposes, e. g., a complex mechanical system combining two galvanometric mirrors, a rotating polygonal mirror and a liquid crystal mask, aimed at speeding up the laser machining of images on production lines.

There are other developments tending to modify the light beam used for marking. Firstly, there are the so-called "amplitude mask" technologies, characterized in that they use masks of identical shape to the shape to machine, thus having two major disadvantages: the mask is unique, and there is an energy loss when the beam is blocked in the zones that do not need marking. Reference can be made, e. g. to the patent documents published under the U.S. Pat. No. 4,128,752 and the French patent number FR 2 909 922.

Dynamic modulators belong to another technology for the direct shaping of a beam. These are active optical elements for spatially modulating the laser optical radiation, and which have the capacity to reflect or transmit a large proportion of the incident laser energy, to the detriment of a more complex, and thus more difficult to use physics.

In the U.S. Pat. Nos. 4,734,558 and 4,818,835 e. g., full systems of laser marking are described, with polarization shaping. The modulators are optically-addressed (illuminated mask), and, electrically-addressed, respectively, to the image of the figure to mark. After transmission or reflection on the latter, the marking laser beams are then spatially modulated with two polarizations, of which one is removed in passage through an analyzer. Only the energy portion with the right polarization is finally transmitted to the focusing lens for marking of the shape filtered by the imaging relation. Although these methods both use dynamic modulators, the use of analyzers has the same disadvantages as the systems with amplitude mask, since they involve the net loss of the energy with the wrong polarization.

In the US patent application US 2001/045,418, it is proposed to use micro-mirror matrices to divide a laser beam into a plurality of independently controlled sub-beams, aimed at simultaneous multi-point marking. The low resolution of micro-mirrors leads, however, to a considerable limit in terms of resolution, and, consequently, in terms of flexibility in generating images. Additionally, the modulator used as an amplitude modulator, and the image generated at the modulator surface, is directly reproduced on the material by the imaging relation, again having the disadvantage of a loss of energy, partially absorbed or ejected.

In the international application WO 01/061619 and the US patent application US 2011/0292157, marking devices are proposed, which use the spatial modulation of light, more specifically configured to modulate the amplitude of a laser beam to mark a material, the image generated at the modulator surface being directly reproduced on the material by imaging. The specific configurations proposed make it possible to mark a plurality of points in a limited number of laser shots. These configurations are still complex to implement, requiring, more particularly, very specific laser sources, and special optical arrangements. Furthermore, these devices also suffer from a gross loss of energy due to amplitude modulation.

In the patent application FR 2 884 743, a machining solution is proposed, using phase shaping of femtosecond (fs) pulse laser beams. A feedback loop between a beam analysis downstream from the shaping and the shaping itself, is used to optimize this shaping for high production rates application with reduced heating effects under these pulse regimes. The solution proposed in this patent application can be used, however, only by a limited number of industries because it needs very specific and expensive laser sources, involving a complex and often expensive to implement setting.

One goal of the present invention is to propose a micromachining method for forming a pattern on a material, for, e. g. identification and/or authentication marking that can be industrially used being in particular, easy to implement, with pre-existing devices and without requiring complex settings.

More particularly, the goal of the present invention is to propose a micromachining method and system for forming a pattern on a material and making it possible to increase productivity compared to existing methods and systems.

Another goal of the present invention is to propose a micromachining method and system for forming a pattern on a material, which would be identification and/or authentication marking without the need to change the setting of said micromachining method and system between two successive markings.

And yet another goal of the present invention is to propose a method for using a micromachining system for optimizing the rate of marking of different products according to the constituent material of said product and to the micromachining system as such.

DESCRIPTION OF THE INVENTION

Thus, we propose a micromachining method for forming a pattern on a material, the pattern consisting of a plurality of points, comprising the following steps:

Emission of a spatially pulsed and time coherent light beam;

Dynamic shaping of said spatially and temporally coherent pulsed light beam, in a modulation plane of a dynamic optical modulation device, by applying at least one phase modulation to shape said light beam according to the plurality of points forming the pattern;

Focusing of the light beam thus shaped by means of a focusing device onto a surface of said material, preferably positioned in a work plane being in a Fourier configuration with respect to the modulation plane;

wherein forming the pattern on the material is carried out with a pulse train, preferably only one pulse train, containing a finite number of pulses of said light beam that is strictly less than the number of points forming the pattern, and where the emission of the light beam is controlled so that each pulse has a determined pulse duration comprised between 10 ps and 100 ns, preferably comprised between 100 ps and 10 ns, and more preferably comprised between 300 ps and 8 ns.

Preferred, but non-limiting aspects of this micromachining method, taken alone or in combination, are the following:

the method is used to form the same pattern, according to the same micromachining parameters, on a plurality of identical products, where every pattern is recorded after having been formed for individual authentication of the products.

the pulse train contains a number of pulses at least two times smaller than the number of points forming the pattern, preferably at least ten times smaller, and more preferably at least one hundred times smaller.

the pulse train contains at least one thousand pulses, preferably less than one hundred pulses, more preferably less than ten pulses, and more preferably the pulse train contains only one pulse.

the method further comprises a step of calculating a modulation set-point value from an input set-point value corresponding to the pattern, said modulation set-point value being imposed on the modulation device for carrying out the dynamic shaping of the light beam.

the light beam emission is controlled for each pulse so as to have a determined energy comprised between 10 µJ and 30 mJ, preferably comprised between 100 µJ and 15 mJ, and more preferably comprised between 1 mJ and 10 mJ.

the light beam emission is controlled so that the pulses of the pulse train have a repetition rate comprised between 10 Hz and 30 kHz, preferably comprised between 20 Hz and 5 kHz, and more preferably comprised between 250 Hz and 1 kHz.

the light beam emission is controlled so that the pulse train delivers an average power comprised between 50 µW and 20 W, preferably comprised between 10 mW and 5 W, and more preferably comprised between 20 mW and 2 W.

the light beam emission is controlled so as to have a rectilinear polarization before the dynamic optical modulation.

We also propose a micromachining system for forming a pattern consisting of a plurality of points on a material, from an emission of a spatially and temporally coherent pulsed light beam, comprising:

a control device for the light beam, comprising means of limiting the emission of said light beam to a pulse train comprising a finite number of pulses less than or equal to the number of points forming the pattern, and means of setting said light beam according to a pulse duration comprised between 10 ps and 100 ns;

A dynamic optical modulation device comprising means of modulating in a modulation plane the light beam set by the control device according to at least one phase modulation from a modulation set-point value, so as to shape said light beam according to the plurality of points forming the pattern;

A control device provided to impose the modulation set-point value to the modulation device and comprising means of calculating the modulation set-point value from an input set-point value corresponding to the pattern;

A focusing device arranged for focusing the light beam shaped by the modulation device onto a surface of said material positioned in a working plane preferably being in a Fourier configuration with respect to the modulation plane of the modulation device.

Preferred, but non-limiting aspects of this micromachining system, taken alone or in combination, are the following:

the focusing device comprises a focusing plane in a Fourier configuration with respect to the modulation plane of the modulation device.

the system further comprises a set of optical members arranged for the focused light beam to be oriented at 90° with respect to the light beam at the system input.

the system has a bulk volume of less than 200×200×250 mm$^3$, preferably of less than 200×200×200 mm$^3$.

According to one aspect, we propose a method for using a micromachining system for forming a pattern consisting of a plurality of points on a material, the system comprising a device for emitting a spatially and temporally coherent pulsed light beam, a dynamic optical modulation device of said light beam comprising a phase modulation for shaping said light beam into a plurality of points and a focusing device of the shaped light beam onto a surface of said material, the method being characterized in that it comprises the following steps:

a. Setting a pulse train by choosing the number of pulses k of said light beam to make the material react;

b. Calculating a threshold density $F_{threshold}(k)$ from which the material reacts for a number k of pulses of said light beam, and determining an associated threshold power $P_{threshold}(k)$;

c. Setting an equation for an available power $P_{avail}(N_k)$ at the output of the modulation device from characteristic parameters of the emission device and of the phase modulation device, $N_k$ being a number to be determined and representing a maximum number of points that can be marked for a train of k pulses;

d. Calculating the maximum number of points $N_k$ that can be marked, under the hypothesis that the number of shaped points has no influence on the threshold from which the material reacts, the maximum number of points $N_k$ that can be marked being calculated so that:

$$N_k = P_{avail}(N_k)/P_{threshold}(k)$$

e. Setting the phase modulation to shape the light beam in a plurality of N points less than or equal to the maximum number of points $N_k$ that can be marked within a number k of pulses of the light beam.

Preferred, but non-limiting aspects of this use method, taken alone or in combination, are the following:

if the maximum number $N_k$ of points that can be marked for a train of k pulses calculated at step d) is less than the number of points forming the pattern, steps a) to d) are repeated in choosing a larger number of pulses k for said light beam.

at step a), a number of pulses k of said light beam is chosen, less than the number of points forming the pattern.

the phase modulation is set to shape the light beam in a plurality of N points limited by a value less than or equal to half of the maximum number of points $N_k$ that can be marked within a number k of pulses of the light beam.

the method comprises a supplementary calculation step for the number of pulse trains required to form a full pattern by dividing the number of points forming the pattern by the plurality of N points chosen for setting the phase modulation, wherein the pattern is a complex pattern decomposing into a plurality of elementary sub-patterns that can be individually formed.

setting the pulse train consists in choosing the number of pulses k according to the calculation of the threshold energy density $F_{threshold}(i)$ for any number of pulses i, the number of pulses k being an integer chosen between the number of pulses $k_{200}$ corresponding to a threshold energy density equal to 200% of the minimum threshold energy density, and the number of pulses $k_{100}$ corresponding to the lowest number of pulses for which the energy density is equal to the minimum threshold energy density.

the calculation of the threshold energy density $F_{threshold}$ is carried out considering that the light beam has a Gaussian shape and that the material irradiated with the light beam reacts from a threshold energy density $F_{threshold}$ given by the following formula:

$$F_{threshold} = F_{peak}\, e^{-D^2/2\omega^2} \text{ with } F_{peak} = \frac{2P_{av}}{v\pi\omega^2}$$

where D is the physical impact diameter of the light beam on the material, $F_{peak}$ is the maximum energy density measured at the optical axis and expressed as a function of the laser average power $P_{av}$, v is the pulse repetition rate and $\omega$ is the radius of the light beam in the focusing plane of the focusing device.

the calculation of the threshold energy density $F_{threshold}$ is carried out by a statistical analysis of occurrence of damage to the material.

the equation giving the available power $P_{avail}(N_k)$ at the output of the modulation device, as a function of $N_k$, is the following formula:

$$P_{avail}(N_k) = P_{laser} u\%x\%\,(C)(cN_k+d)v\% - w\%P_{laser}$$

with:
u % the transmission percentage of the dynamic optical modulation device;
v % the available percentage after the effect of lack of symmetry of the pattern to mark;
w % the percentage lost by the light beam at the central focusing point not subject to shaping from the dynamic optical modulation device;

x % (C) the available percentage after the effect of the application of a curvature C on a phase map for a modulation set-point value applied to the dynamic optical modulation device;

c and d are coefficients for the number of impacts, reflecting the multiplicity of the focusing points of the phase map used for the set-point value applied to the dynamic optical modulation device; the efficiency associated with $N_k$ points is $(cN_k+d)$, where f is the focal length of the focusing device.

the threshold power $P_{threshold}(k)$ is given by the formula:

$$P_{threshold}(k) = \frac{v\pi\omega^2 F_{threshold}(k)}{2}$$

the maximum number of points Nk that can be marked within a number k of pulses of the light beam, is given by the formula:

$$N_k = \frac{Z - dX}{cX - Y_k}$$

with:

$X = P_{laser}\, u\,\% \ x\,\%(C) v\,\%;$ $Y_k = \frac{F_{threshold}(k) v\pi\omega^2}{2};$ $Z = w\,\% \ P_{laser}.$

DESCRIPTION OF THE FIGURES

Other features and advantages of the invention will result from the following description. This description is given as an illustration only, it is non-limiting and should be read considering the appended drawings, wherein.

DETAILED DESCRIPTION OF THE INVENTION

Figure 1:
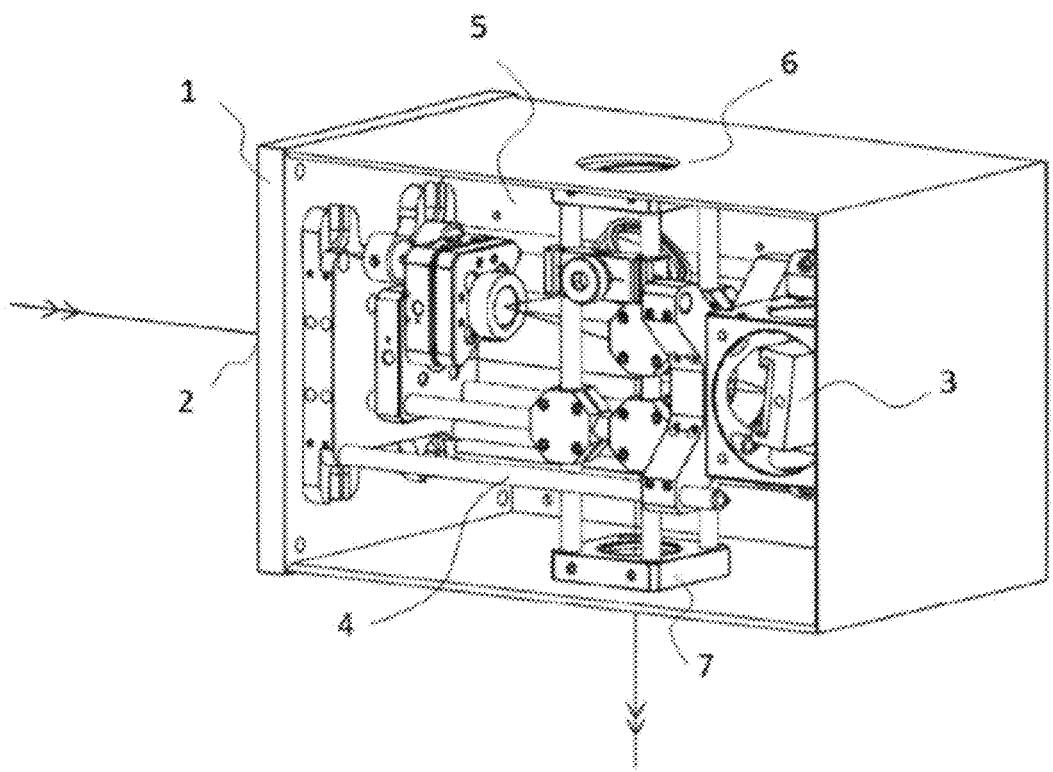
FIG. 1 is a perspective drawing of the micromachining system proposed.

The present invention relates to material micromachining, i.e. the structural modification of materials at small scale compared the dimensions of said material. A special example of micromachining is the marking of a material, i.e. the creation of specific patterns by means of structural modification of a material.

The following description relates to this special example of micromachining which is marking, but the associated invention is by no means limited to this special example, and relates to the whole art of micromachining.

The basic principle proposed consist of modifying a light beam for marking, to create a plurality of marking points simultaneously focused on a surface of the material to mark.

Instead of marking by moving only one focused point over the material, like using a pen, the plurality of focusing points are positioned on the surface of the material to mark, thus marking like using a stamp.

A pattern can thus be marked within a smaller number of light beam pulses than the number of points forming the pattern. This technique has an obvious advantage in an industrial environment, since complex markings can be carried out in short times, thus increasing the production rates without making the marking system more complex.

Such a marking technique does not involve beam shift problems, and thus problems with the synchronisation with the light source, and it does not necessarily need high pulse repetition rates.

In a classical marking scheme using a laser light beam, there is a laser source, a set of optical systems for controlling the laser beam (including, e. g. mirrors, lenses, polarization optical elements, filters), and a final focusing lens.

We are involving here a supplementary unit called a modulator, for the dynamic spatial modulation of the light beam, designed more particularly to control the shape of this beam, i.e. the spatial distribution of optical energy, so as to create light points in the focusing plane of the final lens, corresponding to the marking plane on the material. Preferably, this supplementary unit will be used to dynamically modulate the phase of the light beam within the plane of said unit. The modulator is an active optical element for the spatial modulation of the laser optical radiation. The modulation used can concern the amplitude and/or the phase and/or the polarization of the radiation, whether independent or not. Preferably, a phase modulation will always be carried out, which can be supplemented, if needed, by an amplitude modulation or a polarization modulation of the radiation. According to special marking modes, a pure phase modulation is privileged.

Such a modulator is currently referred to by the English acronym SLM (Spatial Light Modulator), independent of the technology implemented for carrying out said modulation. We are going to be interested here, more particularly, in a subfamily of ITO (Indium Tin Oxide) liquid crystal modulators in gate type transmission or LCOS (Liquid Crystal on Silicon) in reflection, the active optical part of which is a layer of liquid crystals, generally trapped between two electrodes, and even more particularly in two types of liquid crystals: the nematic phase (where crystals are all identically oriented) and the helical nematic phase, otherwise called twisted nematic phase or cholesteric phase (where the crystals are organised in a helical structure).

The first type of liquid crystal, the nematic crystals are used in particular for modulating only the phase of rectilinearly polarised light wave, without modifying the spatial energy distribution or the polarization state.

The second type of liquid crystal, the cholesteric crystals, when used for modulating a transversely polarised light beam with respect to the helix axis, jointly induces a phase modulation and a rotation of the polarization. The addition of a polarizer at the output from such a layer of liquid crystals, makes it possible to transform the polarization rotation into an amplitude modulation of the wave, which thus adds to the phase modulation.

These modulators are usually used in one of the following configurations: a so-called imaging configuration, and a so-called Fourier configuration.

The imaging configuration relies on the principle of conjugate geometrical optics: the modulator is placed within a plane geometrically conjugate with the working plane, so that the spatial intensity distribution in the modulator plane is identically reproduced (to a scale factor) in the working plane (this configuration is used, in particular, in the context of image projection, the optical modulator being optically conjugate with the screen). Two important points should be noted in this imaging configuration:

The light beam used and modulated has no requirement of coherence: the image will form within the working plane even in the case of using a "white" light as emitted by a LED (Light-Emitting Diode) or an incandescent light bulb.

The modification of the phase of the light wave within the modulator plane has no influence on the working plane. This configuration is thus not suitable for nematic phase LCOS modulators.

The so-called Fourier configuration, preferred for the presented micromachining method and system, is a configuration in which electrical fields expressed within the modulator plane and the working plane, are related through a mathematical operation based on the Fourier transform. We say that the working plane is in the Fourier configuration with respect to the modulation plane. Hence there is no identical copy of the phase nor of the intensity, but the relation is known, and the impact of a given modulation is thus predictable. In the Fourier configuration, the spatial energy distribution of the light beam within the modulator plane, is different from the spatial energy distribution of the light beam within the working plane (marking plane), while in the imaging configuration, the spatial energy distributions within the modulator plane and the working plane are identical, of a scale factor. Such a Fourier configuration exists, e. g. between a modulator plane, such as a LCOS modulator, and a working plane located after a long-distance free propagation (according to the Fraunhofer criterion), or between the image and object focal planes of a thin lens. We should note that in this Fourier configuration:

The use of an amplitude and/or phase modulation is relevant. However, a phase modulation alone is the most used for efficiency reasons, since a technique using an amplitude modulation configuration in a Fourier configuration has, in the general case, a transmission less than 50%, which can be a problem.

Since the purpose is to make the beam interfere with itself after modulation, the modulation should not modify the beam characteristics that make this interference possible: more particularly, the polarization should not be modified.

The use of such a Fourier configuration requires the use of a beam capable of interferinf with itself in space and time, thus necessarily coherent, and in the same state of polarization.

According to a preferred embodiment of the presented micromachining method and system, a nematic liquid crystal modulator in a Fourier configuration is used for a pure phase modulation.

The light beam, e. g. a laser beam, incident on the modulator, is controlled for performing effective marking, in particular from an industrial point of view, while being compatible with the modulation device used, in particular the optical resistance of the modulator.

The incident light radiation is usually emitted by a source of pulsed light beams, spatially and temporally coherent, such as a laser beam. A standard laser source, without any special specificity, can be used for example. The coherence of the pulsed light beam is maintained as such before the beam reaches the modulator.

The radiation wavelength can be arbitrary. A preferred domain is established for the visible and near-IR (acronym for infra-red) wavelength range with wavelengths in the [350 nm-2 µm] interval. A band corresponding to the radiation of wavelength comprised in the [1 µm-2 µm] interval, will be preferred depending on the properties of the material to mark. However, when seeking to increase the marking effectiveness, a band corresponding to the radiation of wavelength comprised in the [400 nm-1100 nm] interval will be preferred, and more preferably in the [400 nm-600 nm] interval.

The light beam is pulsed, i.e. consisting of a series of pulses. Moreover, the emission is controlled for the beam to be emitted in the form of pulse trains, also called shots, where a pulse train consists of a finite number of pulses of the light beam.

The present system is compatible with the different shot modes existing at this time, without constraints in terms of pulse repetition rate.

Thus, the beam can be emitted in the form of "shot on demand". In this case, a series of pulses is generated by a triggering signal (often electrical and/or TTL (Transistor-Transistor Logic)) issued by a third element of control (computer, PLC, etc.). E. g., a laser pulse can be generated at each rising edge of a TTL signal, or at each pressing of a button.

Thus, the beam can be emitted in the form of a "continuous shot based on a clock". In this case, the laser source has a regular clock signal and issues a series of pulses at the same repetition rate as the clock.

The beam can also be emitted in the form of a "shot triggered based on a clock", also called "burst" mode, which is preferred. In this case, the laser source has a regular clock signal and a triggering signal, often called a "trigger" or "gate". The principle is similar to the continuous case mentioned above, except that the shot is also limited by the state of the triggering signal. E. g., a laser pulse is emitted only in case of a rising edge of the clock signal and of a triggering signal in the logic state 1.

The pulse duration is also controlled so as to be comprised between 10 picoseconds (ps) and 100 nanoseconds (ns), preferably comprised between 100 picoseconds and 10 nanoseconds, and more preferably comprised between 300 picoseconds and 8 nanoseconds. E. g., an operation rage will be selected, where the pulse duration is controlled so as to be comprised between 100 ps and 8 ns, with privileged operation modes at 200 ps, 400 ps, 600 ps, 1 ns, 5 ns and 8 ns.

Such pulse durations are particularly advantageous since they are compatible with most light sources, in particular a laser, which are widespread in the industrial environment. The proposed micromachining method and system are thus easily transposable to current industrial conditions. Furthermore, these pulse durations are also compatible with significant energy quantities that can be useful for marking certain materials with a pattern containing many points in a very small number of pulses.

The light beam is preferably controlled so that the energy per pulse and the average power of the beam are adequate for marking, taking into account in particular, the intermediate losses suffered in the system, and, more particularly, due to the modulator, while staying below the threshold values beyond which the modulator could be damaged. It should be noted that the phase modulation makes it possible to reduce the intermediate losses at the modulator, and thus to obtain a better marking power for the same input power, and independently of the shape to mark.

Thus, preferably, the light beam emission is controlled for each pulse to have a determined energy comprised between 10 µJ and 30 mJ, preferably comprised between 100 µJ and 15 mJ, and more preferably comprised between 1 mJ and 10 mJ. Higher energies can lead to a partial or total destruction of one of the optical systems implemented in the system, and more particularly, the means of dynamic phase shaping of the modulator.

More preferably, the emission of the light beam is controlled for the pulse train to release an average power comprised between 50 µW and 20 W, preferably comprised between 10 mW and 5 W, and more preferably comprised between 20 mW and 2 W. Higher powers can lead to a partial, but reversible melting of the liquid crystals forming the means of dynamic phase shaping of the modulator, and thus to a partial or total loss of shaping efficiency within the plane of the material to mark. The pulse repetition rate with which each pulse train is emitted, also plays a role that should be taken into account in relation to marking, and also to possible damaging of the modulator. The pulse repetition rate chosen is, moreover, strongly linked to the industrial marking conditions sought.

Thus, preferably the light beam emission is controlled so that the pulses of the pulse train have a repetition rate making it possible to reach the energies and powers mention above, meaning comprised between 10 Hz and 30 kHz, preferably comprised between 20 Hz and 5 kHz, and more preferably comprised between 250 Hz and 1 kHz.

Preferably, for adequately structured marking, a high peak power will be used. However, to prevent the degradation of the modulation device, a moderate average power will be used. Finally, the light beam emission is controlled in order to have an adequate energy per pulse, and a moderate pulse repetition rate at the same time.

One of the solutions for limiting the degradation of the modulation device, is to perform markings where each pulse train required for marking a pattern contains the smallest number of pulses possible.

In any event, the pulse train contains a number of pulses of said light beam, that is strictly less than the number of points forming the pattern, which is particularly advantageous, from an industrial point of view, for increasing the production rates without necessarily needing to increase the operating rates of the micromachining system, in particular that of the light source, which also helps in preserving the modulator.

E. g., the pulse train contains a number of pulses at least two times less than the number of points forming the pattern, preferably at least ten times less, and more preferably at least one hundred times less.

According to a privileged embodiment, the pulse train comprises less than one thousand pulses, preferably less than one hundred pulses, and more preferably less than ten pulses.

Optimally, the pulse train comprises one pulse for forming a pattern a material.

The modulation applied by the modulator is calculated so as to obtain, in fine, the desired shape of the focused beam.

Indeed, a modulation set-point value is calculated from an input set-point value corresponding to the pattern, said modulation set-point value being imposed on the modulation device for carrying out the dynamic shaping of the light beam.

In the case of a modulator including a phase modulation, this calculation can be done e. g. by an algorithm for calculating the phase map of the family of genetic algorithms, or of the Iterative Fourier Transform Algorithms (IFTA), or more generally by any optimisation algorithm adapted to these problems.

Simple optical functions can be further added, in a non-exhaustive manner:
 a transverse shift off all points (phase tilt or ramp);
 an axial shift off all points (phase curvature);
 known beam conformations (axicon, vortex).

The target shape corresponding to the pattern shape can be, a priori, arbitrary:
 Arbitrary shapes consisting of a set of focal points (multipoint shapes), e. g. within the framework of the general applications of micromachining;
 Shapes representing a chain of alphanumeric characters in a "plain" (numbers and letters) or an encrypted form (barcode, bidimensional code—Datamatrix, QR-code, Aztec code, etc.) e. g. within the framework of traceability applications.

The optical path before and after the modulation device consists of a set of optical elements such as, non-exhaustively, mirrors, lenses, afocal systems, optical isolators, waveplates, separator elements and filters, shutters and safety elements.

These optical elements are chosen according to the application sought, in particular the marking considered, and the modulator characteristics.

E. g., before modulation, a set of elements will be provided for:
 Adapting the size of the beam to various elements, more particularly the active surface of the modulator.
 Adapting the energy and power level of the optical radiation to the constraints imposed by the modulator.

After modulation, a set of elements will be chosen, e. g., for:
 "Virtually" adapting the modulator characteristics.
 Focusing the laser radiation on the surface of the target to mark, using a focusing device.

The focusing device is generally industrially defined by a focal length and an associated focal plane, given for specific optical conditions (wavelength, imaging at infinity, index of diffraction and curvature of diopters). In this description, a focusing plane is defined as the minimal surface plane of a light beam, i.e. the plane where the light energy is the most concentrated.

Since the laser beam is focused onto the target, the spatial density of energy, otherwise called radiant exposure and expressed, e. g., in $J/cm^2$, is increased. This high concentration of energy leads to the modification of the target material. This modification can take various forms, in particular:
 Morphological, leading e. g. to the creation of microcavities, structures or textures, deposits, or to the modification of the surface state.
 Chemical, in the form of oxidation, of modification, e. g., of the chemical structure.
 Physical, with, e. g., modification of the optical (index, reflection, absorption), mechanical or structural properties.

We are interested here especially in the modifications that can be observed with visual tools, and hence having an impact on the visual appearance (in a broad sense, not only for the human eye) of the target.

Figure 2:
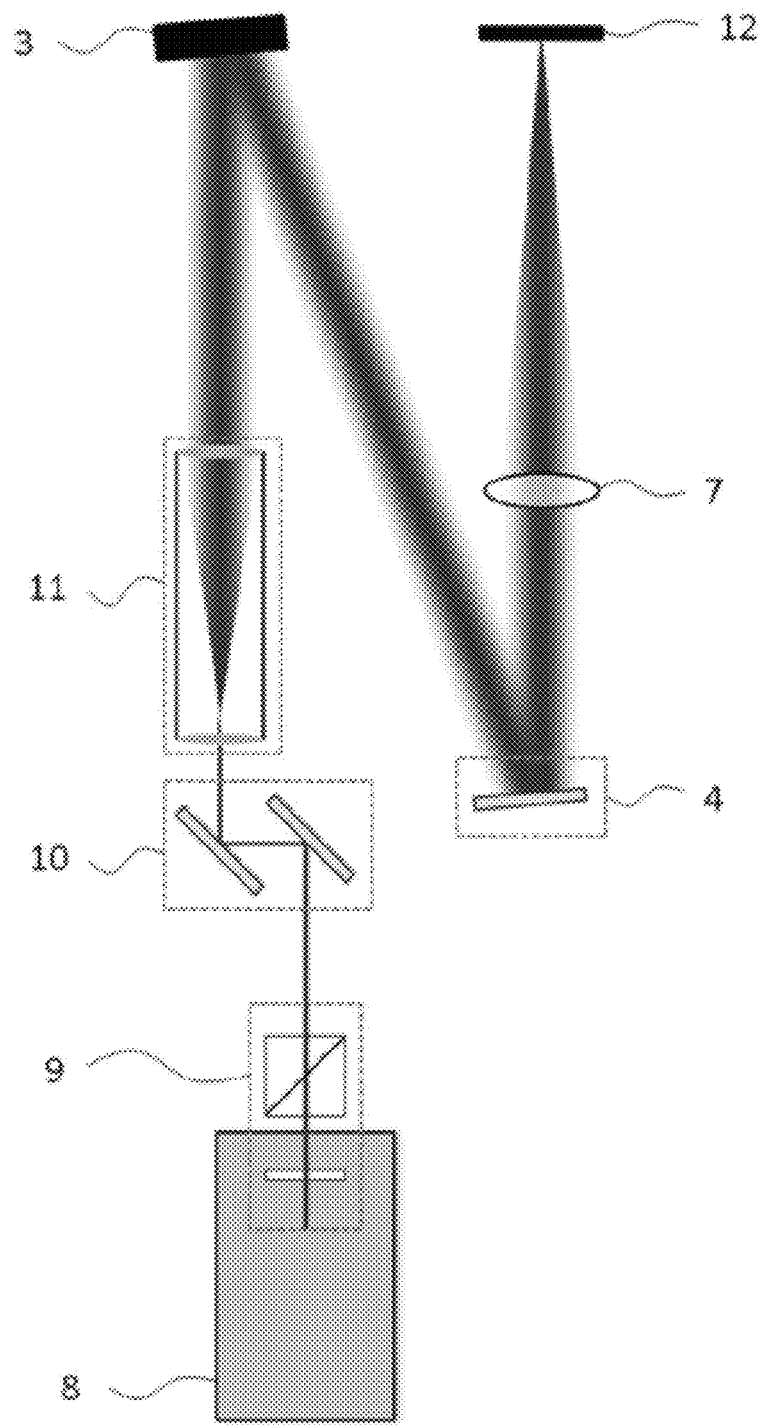
FIG. 2 is a schematic representation of all elements along the optical path of the light beam when using the micromachining system of FIG. 1, from the beam generation to the marking of a sample.

In FIGS. 1 and 2 we are showing an example of a micromachining system for marking materials in an industrial environment and can be used in a compact, integrated environment.

According to this example, the micromachining system—also called marking head—is placed between a laser source 8—which could be another light source—and a material to be marked 12, and preferably comprises:

An opening 2 for an input laser beam with a diameter chosen so as to maximise the filling of the active surface of the optical modulator, without it being necessary that the diameter is bigger than the active surface. We will have, e. g., a diameter less than or equal to 8 mm;

A dynamic optical modulator 3 for, in particular, the spatial modulation of the phase of this laser beam;

A set of optical elements 4 for controlling the position of said beam, e. g. for reorienting the latter along a direction perpendicular to the input direction according to the usual laser marking heads and/or the folding of the optical path to maintain the whole system in a volume similar to or less than the usual laser marking heads (typically smaller than $200 \times 200 \times 250$ mm$^3$, preferably smaller than $200 \times 200 \times 200$ mm$^3$);

A focusing element 7 for concentrating the energy of the shape generated by the modulator 3 on the material 12—this element can be equally a spherical or aspherical lens, thin lens, achromatic doublet or triplet lens, an F-theta lens and/or a telecentric lens. The focusing can be arranged, e. g., perpendicularly to the input face of the system, using the set of optical elements previously cited;

An opening 6 opposite the focusing lens 7 can receive, if need be, a means of viewing the marking zone;

A control electronic system 5, embedded or not embedded, including the control of the optical modulator 3 and/or of the light source and/or the management of a database and/or the graphical interfacing for communication with an operator or other constituent elements of the marking/micromachining installation.

Figure 3:
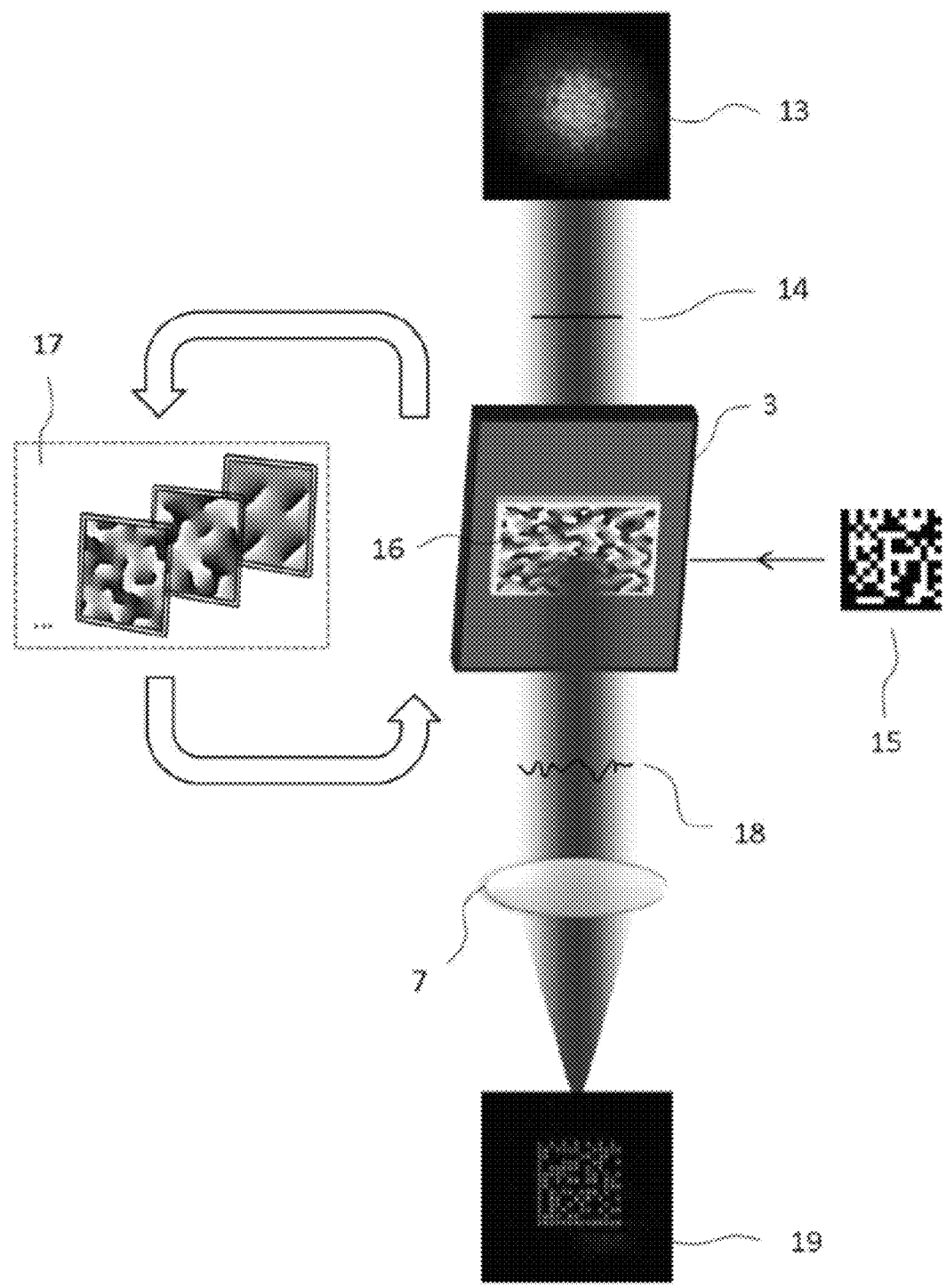
FIG. 3 illustrates the operation principle of a phase modulation device that can be used in the micromachining system of FIG. 1.

An example of a marking method with a micromachining system as proposed, is described, making reference to FIGS. 2 and 3.

First, a light source, such as a laser 8, is used for marking. This source is characterized by the emission of a spatially and temporally coherent pulsed light beam.

Preferably, the emission is controlled for the light beam to have a given rectilinear polarization at the input of the modulator, in particular when a phase modulation is applied. This polarization can, e. g., be imposed using a polarizer and/or a waveplate placed along the path of the light beam.

As specified earlier, the light beam can have a wavelength going from the near-infrared to the visible, taking typical values of 350 nm to 2 μm, preferably 400 nm to 1100 nm.

As specified earlier, a beam with a specific pulse duration is used, in the preferential range comprised between 10 ps and 100 ns, more preferably between 100 ps and 8 ns.

The rated power of the light beam is chosen according to the modulator 3 itself, sensitive to the heating produced by the average power of the laser. A rated power, e. g., less than or equal to 10 W will be used.

Indeed, while the viscosity of the liquid crystals decreases with temperature, making them more rapid at state changes, a too high temperature leads to a reversible melting of these crystals and to the loss of the modulation effects. The control 9 of this power, either internal or external to the reference laser, is then important for the proper operation of the micromachining system.

The control of the number of pulses generated (generally according to "burst" shots) can be associated with this control, equally important within the framework of very high production rate applications where the optimisation window of the method in terms of quality-effectiveness-rapidity can become very narrow.

As indicated earlier, a set of alignment optical elements 10, and the redimensioning of the beam 11, placed upstream of the modulator 3, can be relevant within the framework of the optimum operation of the system.

The phase modulator 3 can be an LCOS SLM or an ITO optical gate. Beam diameters covering most of the active surface 16 of said modulator are preferred, without it the diameter needing to be larger than the active surface. For example typical values of less than or equal to 8 mm are used for the diameter.

This active surface is a matrix of liquid crystals electrically addressed in the case of an SLM, or optically addressed in the case of optical gates, so as to induce the local rotation thereof, and create an optical path difference by varying the optical index and using the birefringence of these crystals, as e. g. in the case of so-called "nematic parallel" liquid crystals. The propagation of the laser beam and more particularly of its wavefront, initially assimilated as plane or curved 14, is then modified 18.

The modulation applied by the modulator, is shown in the form of an image in gray shades 17, and is calculated so as to obtain the desired beam shape 15 only in the focusing zone 19, by means of the lens 7.

A set of positioning optical elements 4 is preferably used again to align the laser beam in this same lens, but also to minimise the system bulk volume, while keeping the necessary configurations (e. g., low incidence on the modulator in reflection).

The target shape 19 can be, a priori, arbitrary and dynamically changed 16 depending upon the input orders 15.

The refresh speed of the modulation cards depends on the characteristics of the modulator chosen, but takes typical values of 10 Hz and 1 kHz, e. g. 60 Hz and less.

In the case of a pure phase modulator 3, the modulation calculation to apply can, e. g., be carried out by means of an algorithm for calculating the phase map of the family of genetic algorithms, of iterative Fourier transform algorithms (IFTA) or any other algorithm suitable for these problems.

This calculation takes into account the optical configuration implemented, in particular concerning the following aspects:

Size and shape of the beam 13, and, more broadly, characteristic of the input optical path;

Characteristics of the radiation (e. g., the wavelength thereof);

Characteristics of the final focusing lens 7 (more particularly, the focal length);

Optical phase conjugation and physical distance from the modulator (or the image thereof) for the same lens.

It should be noted that the distance separating the modulator (physical or virtual) plane before focusing in the final lens (i.e. the focusing device), has to be, ideally, close to the focal length of the latter. More generally, the distance separating the modulator plane and the focusing device is less than 100 times the focal length of the focusing device, preferably less than 10 times this focal length, and more preferably less than 2 times this focal length.

The calculation algorithm, whether or not it can be integrated into the marking head 1, then generates a phase map in the form of an image in gray shades where each shade is associated with a percentage phase-shift, and hence a percentage rotation of crystals, the maximum phase-shift amplitude depending upon the characteristics of the SLM-radiation couple, but also upon the operator's choices.

The initial modulation can be further completed by mathematical/optical functions such as a transverse shift (tilt, prism or phase ramp), an axial shift (phase curvature), a convolution (sum of the phase maps), etc.

The figure to be marked 15 and the calculation algorithm are predefined so as to integrate to the final marking on the sample 12, a multipoint structure favouring a reaction from the material, either morphological (cavity, texturing, deposit, surface state, etc.), chemical (oxidation, etc.), physical (optical (refractive index, absorption, reflection, transmission, etc.) or mechanical (residual stresses, etc.)).

The number of points that can be simultaneously marked depends on multiple conditions such as the laser characteristics (energy, power, polarization, wavelength, pulse duration, pulse repetition rate, etc.), the characteristics of the micromachining system described (energy tolerance, transmission percentage, focusing force, etc.), and also on the irradiated material.

Strong laser energies are thus preferentially recommended since they are distributed between the different marking points.

Knowing the tolerances of the modulators used within the framework of this invention in terms of average power, limits of pulse repetition rates are also taken into consideration.

It is for example established that a pulsed radiation consisting of pulses between about 500 ps and 100 ns, each transporting 2 mJ or less, and emitted with pulse repetition rates of 1 kHz and less, is particularly suitable.

Figure 4:
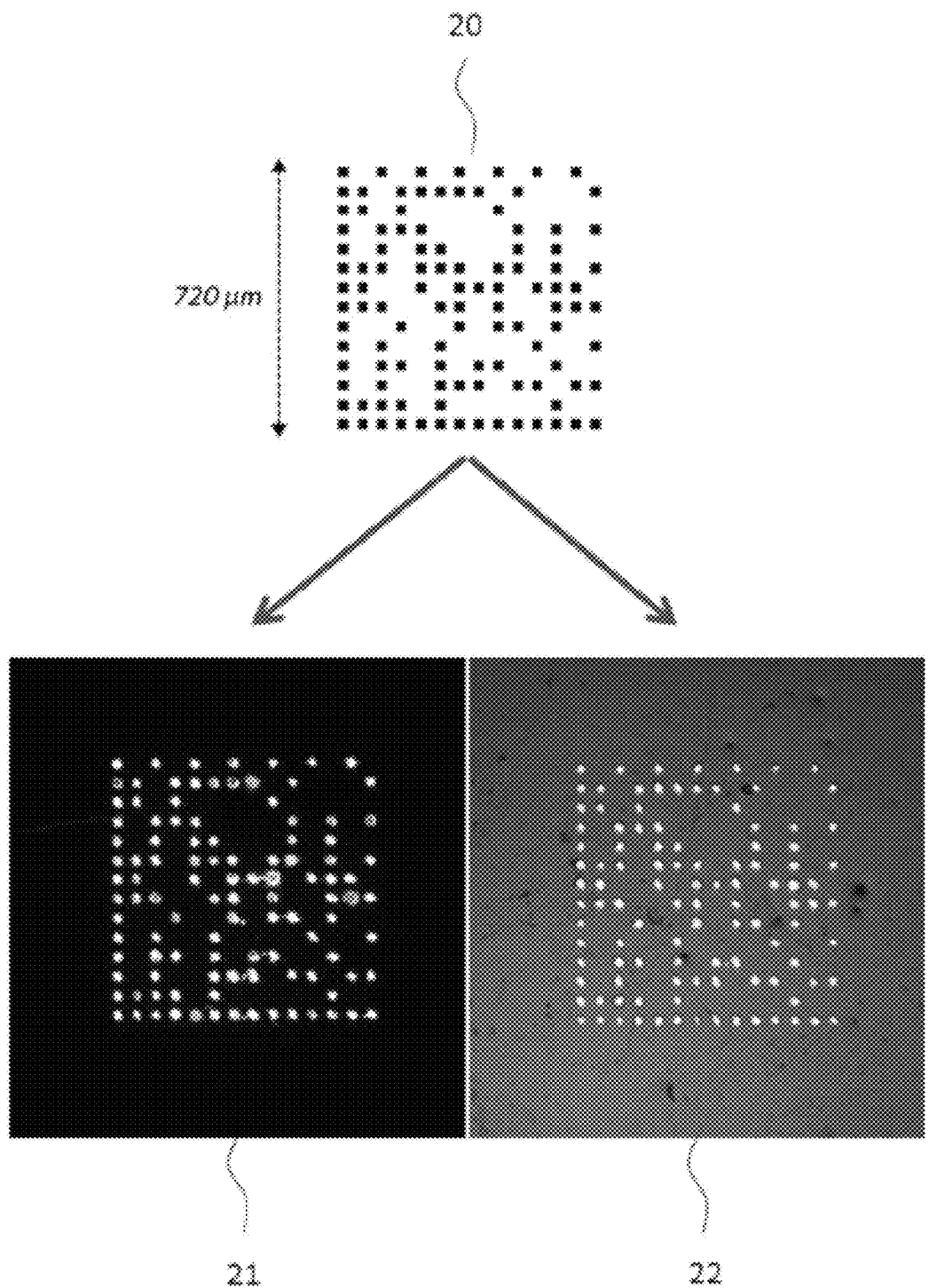
FIG. 4 shows two results of laser marking on a material, obtained using the micromachining method proposed to form a datamatrix pattern.

Moreover, the following operating modes have revealed a good capacity to generate multipoint patterns on multiple materials by means of one pulse or of a train of a few pulses (typically of less than 100 pulses, preferably of less than 10 pulses):

Pulse duration of 400 ps (at plus/minus 5%), energy of 2 mJ or less, and pulse repetition rate of 1 kHz or less;

Pulse duration of 7 ns (at plus/minus 5%), energy of 7 mJ or less, and pulse repetition rate of 20 Hz or less;

Pulse duration of 87 ns (at plus/minus 5%), energy of 100 µJ or less, and pulse repetition rate of 25 kHz or less;

We will now describe an example of embodiment proving the feasibility of marking identifying codes on materials intended for high pulse repetition rate, using the micromachining system and method described above. This example is described making reference to FIG. 4.

The laser used in this example has the following characteristics:

Wavelength 1064 nm;
Output power: 2.2 W;
Pulse duration: 10 ns;
Pulse repetition rate: 1 kHz;
Polarization: linear;
Burst mode shots involving pulse-to-pulse control.

The configuration has been chosen so as to benefit from the maximum energy delivered by this system, namely for a minimum pulse repetition rate of 1 kHz.

Since the output diameter of the beam is a function of the expected power, the latter has been set to the maximum value thereof of 2.2 W, meaning an available energy of about 2.2 mJ.

The variation thereof is externally controlled by the half-wave plate/polarization separator cube couple 9, that makes it possible, moreover, to maintain the proper linear polarization at the input of the marking head 1.

The optical assembly 11 is similar to a telescope, and consists of two focal lenses defined to magnify the beam by a factor of 2, switching from a diameter on the order of 4 mm at the laser output to about 8 mm on the modulator 3.

The optical assembly 10 consists of two mirrors arranged downstream from the assembly 11, aimed at optimising the beam input 2 into the marking head 1, without losses.

The phase modulator 3 is an LCOS SLM with a resolution of 1920×1080, with a surface area of 15.3×8.6 mm² (square pixels with a side of 8 μm/pitch).

The focusing lens 7 comprises only one thin lens with anti-reflective coating for infra-red, with a focal length of 100 mm.

All of these elements involve a marking distance between impacts from a few microns to a few tens of microns, depending upon the resolution of the phase map applied to the SLM.

The input control image 15 is a datamatrix of 14×14 modules which consists of one pixel 20.

The calculation algorithm for generating the associated phase map 17, is an IFTA, the number of iterations being defined here in a quasi-arbitrary manner, but nevertheless greater than ten, in such a way that the optimisation resulting from this calculation is significantly stabilised and thus fluctuates very little from one iteration to the next.

The samples of materials marked 21 and 22 are polymers covered with a metal coating, silver and gold, respectively, with a thickness of a few micrometers.

The image acquisition has been obtained using a microscope with a magnification of ×40, and illumination in transmission.

Pulse trains containing 25 pulses have been used to ablate varnish, meaning 25 ms @ 1 kHz for marking a datamatrix of about 720 μm in side, and containing 108 points.

In similar conditions, but with a standard deflection head such a galvanometric head, using all the power available in one focusing point, the laser required for marking such a datamatrix, should provide a minimum pulse repetition rate of about 4 kHz to be competitive with this same time of 25 ms. At this pulse repetition rate, this supposes one pulse per marking point and the quasi-absence of time loss during the various mechanical repositioning operations.

Compared to a classical marking solution, the technology developed here supposes a better flexibility within the framework of on-the-fly, high production rate marking, and thus shorter execution times that can be optimized more.

The second example of embodiment is aimed at proving the authenticating aspect maximised by the micromachining system proposed, by means of a simple marking example. This example is described making reference to FIG. 5.

The laser used in this example has the following characteristics:
Wavelength 1064 nm;
Output power: 6 W;
Pulse duration: 80 ns;
Pulse repetition rate: 25 kHz;
Polarization: arbitrary;
Modulation of pulse control: 5 kHz.

The configuration of the various optical elements is similar to the previous case. However, this laser with more usual specifications, has much more power for an accordingly higher pulse repetition rate. Also, it does not integrate any pulse-to-pulse control and an external modulation ("trigger" or "gate", as mentioned before) of lower pulse repetition rate is necessary to keep a constant rated output power while having sufficient control over the number of pulses irradiating the sample.

Therefore, for a maximum frequency modulation of 5 kHz at a pulse repetition rate of 25 kHz, the minimum number of pulses per shot authorised per set, is 5.

Also, this system has a random polarization. The passage through a polarizer cube provides the entry into the marking head along the right polarization in spite of the loss of half the energy. 100 μJ of energy (meaning 2.5 W of average power at 25 kHz) finally reach the phase modulator 3.

The input control image 15 is a matrix 23 with 5×5 impacts, meaning 25 points uniformly and regularly distributed over a surface area of 230×230 μm³.

The calculation algorithm for generating the associated phase map 17 is again of the iterative type (IFTA). Within the framework of this example, the control of the number of iterations is essential.

The material to mark is a PE polymer with an aluminum coating of a few hundreds of nanometers.

Figure 5:
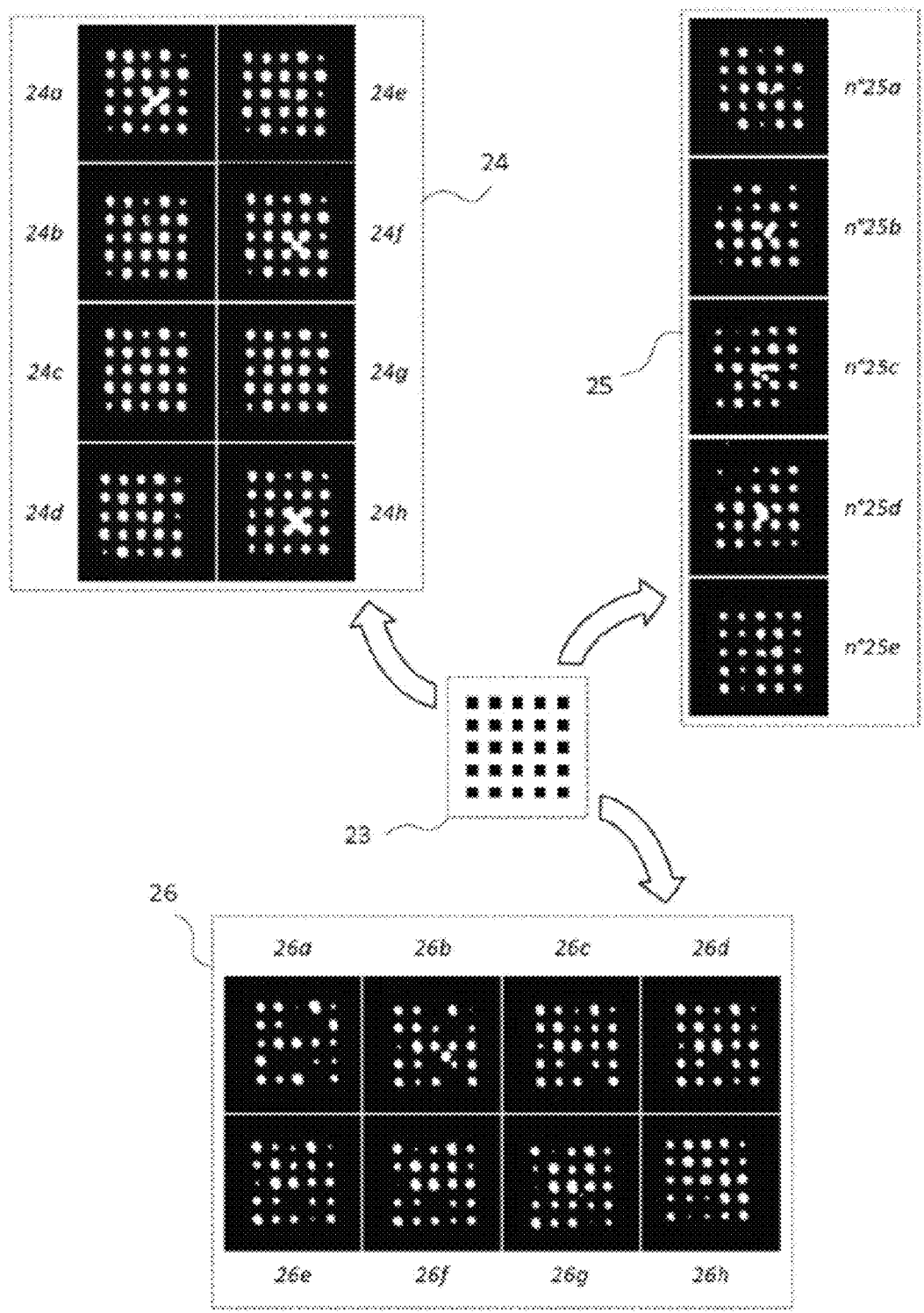
FIG. 5 shows the maximized non-controlled authentication aspect obtained using the micromachining method proposed, from different viewing points.

The series of images 24 in FIG. 5 shows a plurality of matrices of points resulting from the same configurations of irradiation and modulation. Only the positioning over the sample varies.

Slight fluctuations can be observed from one marking to another (typically 24a and 24b), representative of the fluctuations of the properties of the irradiated materials, either by shaping the beam or by the galvanometric head.

The series of images 25 and 26 are nevertheless specific to the use of the shaping head described in this document.

The series of images 25 shows a plurality of markings resulting from the same source image, but the phase maps of which are different. This non-controlled method is intrinsic to the algorithm used which does not converge to a unique solution of the phase map. This fluctuation, associated with that of the incident light source and of the local properties of the material, is added to the uniqueness of the marking, and thus to this authenticating aspect specific to the laser-matter interaction.

Finally, the series of images 26 shows the effect of the number of iterations for the same map being calculated, where the eight images 26a to 26h correspond to tests with, 1, 2, 3, 4, 5, 10, 20, and 50 iterations, respectively. The deviation from the source image is all the more significant as the number of iterations is low due to a partially converged phase map solution.

The absence of certain marking points can be observed 26a, and the occurrence of parasite points 26b, showing the ability of creating a marking with a unique, not-controlled signature.

This example of embodiment clearly shows the whole interest of such an innovation, more particularly on the market of traceability and fight against counterfeiting where the needs in terms of marking and identifying perspectives, are proven.

Thus, the same pattern can be formed according to the same micromachining parameters, on a plurality of identical products, where every pattern is recorded after having been formed for an individual authentication of said products.

The micromachining method and system presented, lead to a considerable gain in productivity. Indeed, on initial examination, the use of a shaped laser beam makes it possible to increase the surface area marked (or of the number of points marked) in one laser shot. The time needed for one marking operation is thus reduced by a factor equal to the number of points being simultaneously marked (or proportional to the surface area ratio).

Moreover, the use of the current optical modulators, makes it possible to consider a dynamic modulation (change of shape in time) with a frequency comprised between 10 Hz and 1 kHz depending on the modulators, e. g. close to 10 Hz-20 Hz, and even up to 60 Hz. If a change of shape is needed between two marking operations (e. g. in the case of an individual numbering of products), the method presents a potential production rate of 36,000 to 72,000 parts per hour (case of 10 Hz to 20 Hz). These productions rates are, a priori, five to ten times higher than current productions rates.

Moreover, the micromachining method and system presented can be used to create complex-shape markings in a few shots. The current solutions are based on the movement of a focused beam, the pattern created intrinsically including rounded edges on the scale of the beam size (often on the order of ten to a hundred micrometers). The use of a shaped beam enable us to consider obtaining a shape, up to now very complex on a small scale, in particular including right or sharp angles.

Moreover, in the special context of laser marking of information encrypted in the form of bi-dimensional codes, the datamatrix format is currently preferred to the QR-code because it is faster to mark for an equivalent content (because it has less numerous movements between two successive modules). And yet this second type has the advantage of easier reading. The use of the installation described here, removes this limitation since having identical execution times for the types of encryption, at equivalent content, due to the simultaneous marking of all points forming the code, provided this number of points is less than the maximum number of points that can be simultaneously marked.

Finally, the micromachining method and system presented are of special interest for product authentication, for example in traceability or fight against counterfeiting applications. Indeed, they can be used to create a unique marking result. During the interaction of the light beam with the target, the result obtained is strongly dependent on the optical properties of the beam and on the physical properties of the target. Combining the control of the spatial distribution of optical energy and the intrinsic non-uniformity of the local properties of a material, a significant variation of the marking result can be obtained from one shot to another. The recording of a signature of these non-repeatable aspects, makes possible a posteriori authentication of the support.

For an optimized use of the micromachining method and system, a method is further proposed, for calculating the number of simultaneous impacts that can take place on a given material.

For this purpose, a list is drawn up of all parameter that can have an influence on the characteristics of the laser-matter interaction at the origin of the feasibility of the multipoint marking described above. These parameters can be grouped into three categories:

Laser parameters: these are the characteristics specific to the laser source, or more generally to the source of radiation;

Parameter of the micromachining method and system: these are the characteristics specific to the micromachining system, to the setting thereof and to the operation thereof, for treating the beam emitted from the laser to the sample;

Material parameters: these are the characteristics specific to the final research material, since the laser-matter interaction is dependent of the properties of each material such as absorption-transmission properties, melting-vaporization temperatures, etc.

After having identified these different parameters, a simulation as close as possible to the multipoint marking reality can be carried out, aimed at optimizing the use of the proposed micromachining system. This use can also be based on actual marking tests.

Let us first list the parameters characterising the light source, generally a laser source. When using a micromachining system with a pre-existing industrial laser, these parameters are often found in the documentation associated with said laser. We can cite, more particularly:

The wavelength $\lambda$

The pulse repetition rate $v$

The pulse duration $\tau$

The polarization p

The average power $P_{laser}$

The output diameter $D_{output}$

The divergence $\alpha$

For an optimised operation of the marking head, as proposed above, the laser wavelength $\lambda$ is preferably adapted to the different treatments of the optical systems of the method, the polarization p is rectilinear according to an orientation defined by the marking head, the output diameter of the beam $D_{output}$ is adapted to the active zone of the modulator, and the beam divergence is minimized (so-called collimated beam). In these two last cases, a well-chosen set of lenses is used both to adapt the size of the laser beam to the marking head, and also to reduce the divergence so as to obtain a quasi-collimated beam.

Amongst the parameters of the micromachining method and system, we emphasize the set of optical systems for readapting the characteristics of the beam at the laser output (we have mentioned the notions of divergence and of polarization), the specificities specific to the desired marking (focal length), and the properties of the marking head by means of the shaping described in detail above.

We consider here that the laser beam corresponds to the data required at the input of the marking head. The latter is characterized by the following:

Transmission percentage u %: since SLM is a pixelized optical system, a non-negligible percentage of energy loss is to be considered in the estimation of the energy available for shaping; this parameter also integrates the imperfections of the treatment of the optical systems forming the optical path after the modulator.

Available percentage after the lack of symmetry effect v %: a loss of energy has been observed, due to the pattern to be marked between a symmetric shaping with respect to the optical axis, and a non-symmetric shaping, symbolized by a quantity estimated at v %;

Percentage lost by central spot w %: due to the lack of perfection of the optical systems and of the laser properties, and to calculation approximations, an amount of energy, estimated again by a constant w %, is found in a central focal point, not subjected to the shaping applied to the beam by the system.

Percentage available by means of addition of a curvature x % (C): like a symmetric or non-symmetric shaping, the execution of a phase map containing a curvature value, has an influence on the quantity of energy available for shaping. C is the curvature value applied within the framework of shaping;

Coefficients for the number of impacts c & d; available percentage depending upon the number of points $N_k$ to mark ($cN_k$+d): like for a symmetric or non-symmetric shaping, the execution of a phase map generating a different number of focusing points on the material, has an influence on the quantity of energy available for the shaping of the same number of points.

Focal length f: working distance according to the defined convergent focusing lens. This parameter is used to define, amongst others, the size of the laser beam in the marking plane, and thus the energy density in this plane.

Once all these parameters are characterized, the power available for shaping the beam is then calculated from the following formula, as a function of the number of points to mark, $N_k$, which remains to be defined:

$$P_{avail} = P_{laser} \cdot u\% \cdot x\% \cdot (C)(cN_k+d) \cdot v\% - w\%/P_{laser}$$

Since each material has its specific absorption properties, it is characterized by thresholds in terms of energy and energy density, from which the material starts to react and to change its appearance. Determining these thresholds is important for validating or not the feasibility of a marking procedure using a given laser.

These thresholds also depend on the nature of the marking we seek to create. The marking threshold will be, e. g., different if we seek visibility on the nanometric scale, on the microscopic scale or on the scale of the human eye. The threshold can also depend on the desired intensity of marking. Indeed, as specified above and as described in the article of J. BONSE et al. published on 20 Jun. 2001 with the title "Femtosecond laser ablation of silicon-modification thresholds and morphology" (APPLIED PHYSICS A, 74, 19-25 (2002), DOI 10.1007/s003390100893), there are several levels of modifications of materials that can be qualified and to which an energy density threshold can be associated.

To determine the reaction threshold of a material, several methods are available in the scientific literature. The article of N. SANNER et al., published on 14 Jan. 2009 with the title "Measurement of femtosecond laser induced damage and ablation thresholds in dielectrics", (APPLIED PHYSICS A, (2009) 94:889-897, DOI 10.1007/s00339-009-5077-6), gives a comparative description of the three main methods.

The first and most current method is a regression method based on the impact diameter on the material being marked, more commonly known as Liu's method, which makes the assumption of a perfect transverse shape of a laser beam (Gaussian shape) with the following formula:

$$F(r) = F_{peak} e^{(-2r^2/\omega^2)} \text{ with } F_{peak} = \frac{2P_{av}}{v\pi\omega^2},$$

where:

F is the energy density (in J/cm², also currently called radiant exposure), r is the distance to the optical axis, $F_{peak}$ is the maximum radiant exposure measured at the optical axis, expressed as a function of the laser average power $P_{av}$, v is the pulse repetition rate, and ω is the beam radius at the focusing plane (also currently called "waist") and is directly dependent on the focal length f of the system lens.

Liu's method considers, more particularly, that the irradiated material reacts from a certain energy density on, $F_{threshold}$, associated to a physical impact diameter D, i.e.:

$$F_{threshold} = F_{peak} e^{-D^2/2\omega^2}$$

From which, after handling this equation, we obtain:

$$D^2 = 2\omega^2 \ln(F_{peak}) - 2\omega^2 \ln(F_{threshold})$$

Finally, it appears that the impact diameter, D, on the machined material, linearly increases as a function of $\ln(F_{peak})$ and thus indirectly as a function of power. Under the hypothesis that the modeling of the laser-matter interaction is linear (the material responds proportionally to the incident energy), the threshold $F_{threshold}$ is estimated as the ordinate at the origin of this axis.

The second method is also a regression method, but based this time on the observations on the depths of volumes ablated (we will talk about an ablation rate). Indeed, at increasing light intensity, more energy will be naturally absorbed by the irradiated matter, leading in time to a change of the machining morphology, and more particularly to a larger ablation depth and/or marking diameter. All of these values can be modelled as a function of the radiant exposure applied to the material, the reaction threshold $F_{threshold}$ being derived from the extrapolation obtained at zero volume (or depth). Inversely from Liu's method, the method using the ablation rate, analyses the marking result independently from the shape of the beam, whether Gaussian or not, while the method again requires a linear response of the material with respect the applied irradiation.

Finally, the third method uses a statistical analysis for the occurrence of damage. This method has the advantage of being visual, independent of the beam and the material, and directly usable without any supplementary analysis. Indeed, a set of impacts with identical parameters is repeated a number of times by the operator, while the marking repeatability is measured. At low radiant exposure, none of these markings will be visible, while at high radiant exposure, all markings will appear. Intermediate radiant exposures between these 2 configurations are defined as damage threshold radiant exposures. Contrary to the two previous methods, this method has the advantage of not being deterministic in the sense that there is no fixed threshold value, but a transitional regime specific to the material. With the application of such a method and given the multipoint marking methods presented here, the threshold radiant exposure $F_{threshold}$ will be for example the minimum radiant exposure from which all impacts become visible.

We should state it here that, under the hypothesis of a Gaussian spatial revolution profile, the threshold radiant exposure values, according to one of these methods, are also valid for energy and intensity, by means of a simple relation of proportionality, according to the equation:

$$F_{threshold} = \frac{2P_{threshold}}{v\pi\omega^2}$$

We should note further that the pulse duration has an influence in this marking threshold $F_{threshold}$ meaning that a shorter pulse duration reduces the threshold. The number of impacts that can be simultaneously executed, will theoretically increase as the pulse duration decreases.

The methods presented above are generally used with laser shots containing only one pulse. The threshold thus defined corresponds to the single-pulse laser threshold of the irradiated material.

In a preferred manner, the method used with laser shots consisting of a plurality of pulses, is transposed by reiterating several times the calculation for a plurality of numbers of specific pulses. As a result, a so-called incubation phenomenon appears on most materials, characterized by the reduction of the considered threshold with the increase of the number of laser pulses forming the laser shot.

If k is the number of pulses contained in a laser shot, this phenomenon can thus be represented by replacing the previous threshold $F_{threshold}$ (respectively $P_{threshold}$) by the function $F_{threshold}(k)$ (respectively $P_{threshold}(k)$).

Figure 6:
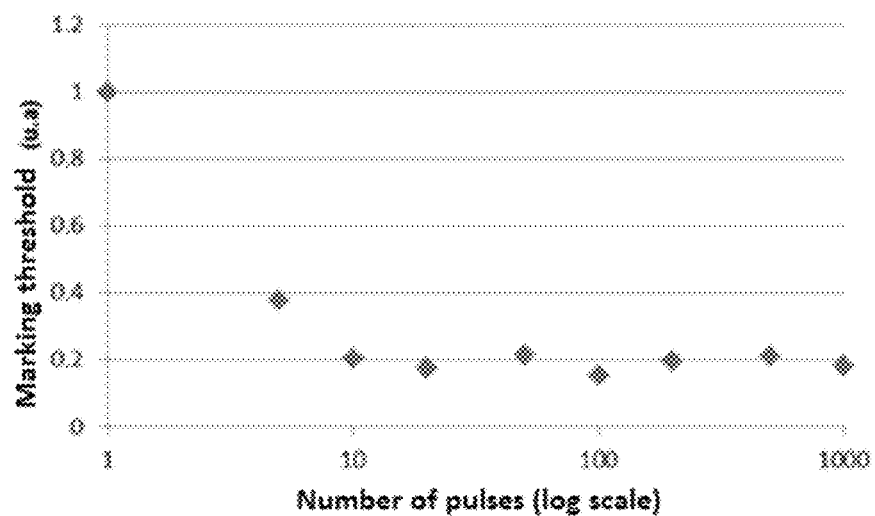
FIG. 6 is a graph illustrating the change of a reaction threshold of a material with the number of pulses per laser shot.

FIG. 6 is a typical schematic representation illustrating the change of the threshold ($F_{threshold}$ or $P_{threshold}$) as a function of the number of pulses k per pulse train. A saturation effect can be observed for the incubation illustrated in the figure, by the horizontal asymptote.

A first step in the simulation procedure for the estimation of the theoretical number of simultaneous points that can be marked on a given material by a given laser, consists of recovering or calculating the different parameters mentioned.

Secondly, knowing the marking threshold of the material and the available laser power, (as a function of $N_k$ that we seek to define) for shaping, we make the hypothesis that the number of points shaped has no influence on the marking threshold of the material, assuming that these impacts are dissociated.

It is therefore estimated that the available power is equivalent to the reaction threshold power of the material through the maximum number of points that can be, in theory, marked by means of shaping, for a number k of pulses per laser shot, i.e.:

$$P_{avail}(N_k) \cong N_k P_{threshold}(k)$$

By applying this relation to the reaction threshold equation of a material, for a number k of pulses per pulse train, we have:

$$F_{threshold}(k) = \frac{2P_{threshold}(k)}{v\pi\omega^2} \text{ i.e. } P_{avail}(N_k) \cong N_k \frac{v\pi\omega^2 F_{threshold}(k)}{2}$$

Finally, associating this equation with that made explicit in the description of the parameters of the micromachining method and system, an equation with one unknown, $N_k$, is obtained, since the other parameters are known, i.e.:

$$P_{laser} \, u \, \% \, x \, \% \, (C)(cN_k + d)v \, \% - w \, \% \, P_{laser} = \frac{F_{threshold}(k)N_k v\pi\omega^2}{2}$$

From here we finally obtain the estimation of the maximum number of simultaneous points $N_k$ by means of the shaping of the marking head using a pulse train with k pulses:

$$N_k = \frac{Z - dX}{cX - Y_k}$$

with:

$$X = P_{laser} \, u \, \% \, x \, \% \, (C) \, v \, \%$$

$$Y_k = \frac{F_{threshold}(k)v\pi\omega^2}{2}$$

$$Z = w \, \% \, P_{laser}$$

This method makes it finally possible, by means of the different parameters of the full system, to estimate in-depth the maximum number of points $N_k$ that can be simultaneously marked by means of the shaping of a beam of a laser shot with k pulses, knowing the characteristics of the laser source used and of the material to be marked.

By extension, we note N∞, the limit value of the series (which converges, a priori, due to the saturation of the incubation) which represents the maximum number of points that can be simultaneously marked, in theory.

From this maximum number of points $N_k$ that can be simultaneously marked by means of shaping a laser shot with k pulses, the micromachining system can be adjusted by setting, in particular, the modulation device for shaping the light beam in a plurality N of points, less than or equal to the maximum number of points $N_k$ that can be marked for k given pulses.

To be sure that every point is properly marked on the material, this number N of shaping points can be set to be strictly less than the maximum number of points $N_k$ that can be simultaneously marked by means of shaping a laser shot with k pulses, which makes it possible, indeed, to have more available energy for marking.

We should note that the maximum value $N_k$ is representative for a threshold value. As an example, in the configuration where one damage or marking threshold is considered, the impacts just start to mark. It is also preferred, in this case, to set a limit N with a smaller value than the maximum value $N_k$, for example $N \leq N_k/2$ or $N \leq N_k/3$.

We can further derive from here, the number of pulse trains required to form the full pattern, in particular in the case of complex patterns, by dividing the number of points forming the pattern by the number of shaping points chosen for the setting of the phase modulation.

The setting of the number k of pulses of the pulse train to be used for marking can be empirical, knowing in particular, the characteristics of the material to mark and the characteristics of the emission device and of the phase modulation device.

It is also possible to calculate the function giving the threshold energy density $F_{threshold}(i)$ for an arbitrary number of pulses i, using e. g. one of the three methods described above and to choose the number of pulses k the most adapted to marking a pattern consisting of a given number of points.

The number of pulses k can be chosen, e. g., according to the calculation of the function giving the threshold energy density $F_{threshold}(i)$, where the number of pulses k is an integer chosen between the number of pulses $k_{200}$ corresponding to a threshold energy density equal to 200% of the minimum threshold energy density, and the number of pulses $k_{100}$ corresponding to the lowest number of pulses for which the energy density is equal to the minimum threshold energy density.

BIBLIOGRAPHY

U.S. Pat. No. 5,734,145
U.S. Pat. No. 4,128,752
FR 2 909 922
U.S. Pat. No. 4,734,558
U.S. Pat. No. 4,818,835
US 2001/045,418
FR 2 884 743
WO 01/061619
US 2011/0292157
N. SANNER et al., "Measurement of femtosecond laser induced damage and ablation thresholds in dielectrics", APPLIED PHYSICS A, (2009) 94:889-897, DOI 10.1007/s00339-009-5077-6
J. BONSE et al., "Femtosecond laser ablation of silicon-modification thresholds and morphology", APPLIED PHYSICS A, 74, 19-25 (2002), DOI 10.1007/s003390100893

The invention claimed is:
1. A micromachining method for forming a pattern on a material, the pattern consisting of a plurality of points, comprising the following steps:
emission of a spatially pulsed and time coherent light beam;

dynamic shaping of said spatially and temporally coherent pulsed light beam, in a modulation plane of a dynamic optical modulation device, by applying at least one phase modulation to shape said light beam according to the plurality of points forming the pattern;

focusing of such a shaped light beam by means of a focusing device onto a surface of said material positioned in a work plane being in a Fourier configuration with respect to the modulation plane;

wherein forming the pattern on the material is carried out with a pulse train containing a finite number of pulses of said light beam that is strictly less than the number of points forming the pattern, and wherein the emission of the light beam is controlled so that each pulse has a determined pulse duration comprised between 10 ps and 100 ns.

2. The method of claim 1, wherein the emission of the light beam is controlled so that each pulse has a determined pulse duration comprised between 100 ps and 10 ns.

3. The method of claim 1, wherein the emission of the light beam is controlled so that each pulse has a determined pulse duration comprised between 300 ps and 8 ns.

4. The method of claim 1, wherein the material is positioned within a working plane corresponding to the focusing plane of the focusing device.

5. The method of claim 1 used to form the same pattern, according to the same micromachining parameters on a plurality of identical products, wherein every pattern is recorded after having been formed for the individual authentication of the products.

6. The method of claim 1, wherein the pulse train comprises a number of pulses at least two times less than the number of points forming the pattern.

7. The method of claim 1, wherein the pulse train comprises less than one thousand pulses.

8. The method of claim 1, further comprising a step of calculating a modulation set-point value from an input set-point value corresponding to the pattern, said modulation set-point value being imposed on the modulation device for carrying out the dynamic shaping of the light beam.

9. The method of claim 1, wherein the light beam emission is controlled for each pulse so as to have a determined energy comprised between 10 µJ and 30 mJ.

10. The method of claim 1, wherein the light beam emission is controlled so that the pulses of the pulse train have a repetition rate comprised between 10 Hz and 30 kHz.

11. The method of claim 1, wherein the light beam emission is controlled so that the pulse train delivers an average power comprised between 50 µW and 20 W.

12. The method of claim 1, wherein the light beam emission is controlled so as to have a rectilinear polarization before the dynamic optical modulation.

13. The method of claim 1, wherein the pulse train comprises a number of pulses at least ten times less than the number of points forming the pattern.

14. The method of claim 1, wherein the pulse train comprises a number of pulses at least one hundred times less than the number of points forming the pattern.

15. The method of claim 1, wherein the pulse train comprises less than one hundred pulses.

16. The method of claim 1, wherein the pulse train comprises less than ten pulses.

17. The method of claim 1, wherein the pulse train comprises only one pulse.

18. The method of claim 1, wherein the light beam emission is controlled for each pulse so as to have a determined energy comprised between 1000 and 15 mJ.

19. The method of claim 1, wherein the light beam emission is controlled for each pulse so as to have a determined energy comprised between 1 mJ and 10 mJ.

20. The method of claim 1, wherein the light beam emission is controlled so that the pulses of the pulse train have a repetition rate comprised between 20 Hz and 5 kHz.

21. The method of claim 1, wherein the light beam emission is controlled so that the pulses of the pulse train have a repetition rate comprised between 250 Hz and 1 kHz.

22. The method of claim 1, wherein the light beam emission is controlled so that the pulse train delivers an average power comprised between 10 mW and 5 W.

23. The method of claim 1, wherein the light beam emission is controlled so that the pulse train delivers an average power comprised between 20 mW and 2 W.

* * * * *